United States Patent
Wang et al.

(10) Patent No.: US 10,821,397 B2
(45) Date of Patent: Nov. 3, 2020

(54) SQUARE PACKED TOWER FOR CAPTURING FLUE GAS CARBON DIOXIDE

(71) Applicant: ZHEJIANG UNIVERSITY, Hangzhou (CN)

(72) Inventors: Tao Wang, Hangzhou (CN); Mengxiang Fang, Hangzhou (CN); Wenfeng Dong, Hangzhou (CN); Qinhui Wang, Hangzhou (CN); Jianmeng Cen, Hangzhou (CN); Leming Cheng, Hangzhou (CN); Gang Xiao, Hangzhou (CN); Chenghang Zheng, Hangzhou (CN); Jinsong Zhou, Hangzhou (CN); Shurong Wang, Hangzhou (CN); Xiang Gao, Hangzhou (CN); Zhongyang Luo, Hangzhou (CN); Mingjiang Ni, Hangzhou (CN); Kefa Cen, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 153 days.

(21) Appl. No.: 16/089,154

(22) PCT Filed: Nov. 27, 2017

(86) PCT No.: PCT/CN2017/113045
§ 371 (c)(1),
(2) Date: Sep. 27, 2018

(87) PCT Pub. No.: WO2018/099341
PCT Pub. Date: Jun. 7, 2018

(65) Prior Publication Data
US 2019/0099712 A1    Apr. 4, 2019

(30) Foreign Application Priority Data

Dec. 1, 2016 (CN) .......................... 2016 1 1091203

(51) Int. Cl.
*B01D 53/18* (2006.01)
*B01D 53/14* (2006.01)
(Continued)

(52) U.S. Cl.
CPC ....... *B01D 53/185* (2013.01); *B01D 53/1475* (2013.01); *B01D 53/18* (2013.01);
(Continued)

(58) Field of Classification Search
None
See application file for complete search history.

(56) References Cited

U.S. PATENT DOCUMENTS

2014/0301929 A1* 10/2014 Wang ................ B01D 53/1475
423/228

FOREIGN PATENT DOCUMENTS

CN            205288016 U  *  6/2016  ............ B01D 53/18

* cited by examiner

*Primary Examiner* — Derek N Mueller
(74) *Attorney, Agent, or Firm* — Jiwen Chen; Jacobson Holman PLLC

(57) ABSTRACT

The present invention is related a square packed tower for collection of flue gas $CO_2$. The square packed tower comprises an initial absorbent distributor on the lower end of the flue gas outlet, a vertical plate packer on the lower end of the initial absorbent distributor and a radial diversion gas distributor at the bottom of the square packed tower for delivery of carbon dioxide contained in the flue gas. The radial diversion gas distributor comprises a gas inlet pipe, a butterfly base plate, a butterfly seal plate and numerous radial deflectors. The butterfly base plate is connected with outlet of the gas inlet pipe. The radial deflectors are in radial arrangement between the butterfly base plate and butterfly seal plate along the outlet of gas inlet pipe.

9 Claims, 11 Drawing Sheets

(51) Int. Cl.
  *F23J 15/06* (2006.01)
  *F23J 15/04* (2006.01)
(52) U.S. Cl.
  CPC ............... *F23J 15/04* (2013.01); *F23J 15/06* (2013.01); *B01D 2257/504* (2013.01); *B01D 2258/0283* (2013.01); *F23J 2215/50* (2013.01); *Y02C 10/06* (2013.01)

SQUARE PACKED TOWER FOR CAPTURING FLUE GAS CARBON DIOXIDE

This is a U.S. national stage application of PCT Application No. PCT/CN2017/113045 under 35 U.S.C. 371, filed Nov. 27, 2017 in Chinese, claiming priority of Chinese Application No. 201611091203.1, filed Dec. 1, 2016, all of which are hereby incorporated by reference.

FIELD OF THE INVENTION

The present invention is related to the field of carbon dioxide collection equipment, in particular to a square packed tower for collection of flue gas $CO_2$.

BACKGROUND ARTS

The flue gas $CO_2$ emission from thermal power plants accounts for more than 60% of industrial $CO_2$ emission. Therefore, the study of flue gas $CO_2$ emission reduction in thermal power plants is of great significance for $CO_2$ emission reduction in China.

Absorbing tower, designed to collect a large quantity of $CO_2$ from coal-fired power plants, normally uses carbon steel tower body, stainless steel internal components and regular packing, which accounts for 30-40% of investment in chemical flue gas $CO_2$ collection system of power plants. In view of big tower diameter and low aspect ratio of packing layer of absorbing tower, a stainless steel regular packing is used. However, the stainless steel regular packing has higher requirements for truss support beam. The flue gas passing through the gas distributor may result in increased gas bias and pressure drop to the extent of affecting mass transfer effect of gas-liquid phase on the packing layer. Quadrate reinforced concrete packing tower is used during collection of flue gas $CO_2$ from power plants. It is essential to deploy initial air intake distributor of excellent performance to alleviate end effect of gas phase distribution.

Flue gas $CO_2$ absorbing tower of a power plant normally adopts conventional corrugated orifice plate packing to facilitate reversed flowing of flue gas and absorbed solution on the packing sheets for heat transfer. In the process of heat transfer, the absorbent will flow downwards along the corrugated surface in a film form under the gravity action. As liquid film of absorbent will flow along the corrugated packing surface in the form of laminar flow, and may accumulate at valleys of the corrugated packing surface. Thus, the liquid film of absorbent will not uniformly cover the packing surface. Meanwhile, thicker liquid film at the valleys and slow surface renewal speed may result in poor mass transfer performance. For these reasons, it is required to have a regular packing structure with a large specific area, a high film forming rate, a limited pressure drop and a low manufacturing cost. Chinese Patent ZL201210234334.6 has disclosed a regular packing with alternated walled and wall-free liquid film that is in accommodation with viscous absorbent, including liquid collection-initial distribution part, liquid distribution part, structuralized solid wall face and holes. However, aforesaid packing has a series of new problems, such as poor distribution of liquid film and small gas-liquid mass transfer area. For this reason, it has never been manufactured and applied on a large scale.

A large tower is normally equipped with a dual tangential circulation gas distributor and a double-row blade gas distributor. As the gas from the dual tangential circulation gas distributor is delivered downwards through an arc diversion and upwards through baffling by the internal drum, it may result in extremely low velocity of flow in the tower wall area. Furthermore, special structure of the quadrate tower may also result in serious unevenness to gas phase distribution on the wall surface and at the included angle. When the double-row blade gas distributor is used to the quadrate tower, gas velocity on both sides of the tower wall is relatively high, and the air at the center will flow downwards to produce whirlpool to the extent of resulting in poor gas phase distribution. As indicated in existing literature, Chinese Invention Patent (CN 104607111 A) has disclosed a combined feeding distributor; a double-row blade feeding distributor is provided in the dual tangential feeding distributor to divert the inlet gas, and minimize disturbance to the liquid at tower bottom by the gas and whirlpool inside the tower; however, such structure has failed to solve the problem with extremely low gas velocity on both sides of the tower wall. Moreover, it also has such disadvantages as complicated structure and high installation cost.

Mass transfer inside the flue gas $CO_2$ absorption tower normally takes place at the top of the packing tower. At the bottom, extremely high temperature of absorbent may result in low absorption load and mass transfer efficiency. In such case, it is necessary to provide an inter-stage cooling device at the center of the packing tower. However, the tower plate is normally provided to send the absorbent out of the tower for cooling. It comprises such equipment as a tower plate, a plate heat exchanger and two circulating pumps; this may incur such problems as high investment and complicated processes.

SUMMARY OF THE INVENTION

The present invention aims to provide a square packed tower for collection of flue gas $CO_2$ in view of disadvantages to prior arts so as to solve such problems as low mass transfer efficiency of packing tower, uneven gas phase distribution inside the tower and high investment.

Technical solutions as provided by the present invention for settlement of aforesaid technical issues are stated as follows:

A square packed tower for collection of flue gas $CO_2$, characterized in that the square packed tower comprises an initial absorbent distributor on a lower end of a flue gas outlet, a vertical plate packing on a lower end of the initial absorbent distributor and a radial diversion gas distributor at the bottom of the square packed tower for delivery of carbon dioxide contained in the flue gas.

The radial diversion gas distributor comprises a gas inlet pipe, a flat base plate with four equal triangular protrusions, a flat seal plate with four equal triangular protrusions and numerous radial deflectors; the flat base plate with four equal triangular protrusions is connected with outlet of the gas inlet pipe; the radial deflectors are in a radial arrangement between the flat base plate with four equal triangular protrusions and the flat seal plate with four equal triangular protrusions along the outlet of the gas inlet pipe.

The radial diversion gas distributor is normally installed at the bottom of the square packed tower; whereas an outlet of gas intake pipe is installed on the wall of the square packed tower. The gas is to be divided into numerous flows of uniform velocity by the radial deflector once it is delivered into the gas intake pipe. Due to axial flow limiting by the flat seal plate with four equal triangular protrusions, the gas will uniformly flow to and collide with the tower wall before turning to the tower top. Through axial flow limiting and axial diversion of intake gas, it can increase flow velocity of the gas on both sides of the tower wall, minimize whirlpool produced by the gas above the distributor, improve gas phase uniformity, and reduce the resistance loss.

In a preferred embodiment, the center of numerous radial deflectors between the flat base plate with four equal triangular protrusions and flat seal plate with four equal triangular protrusions is symmetrical to the center of outlet of the gas intake pipe.

In a preferred embodiment, the included angle between two adjacent radial deflectors is 5-20°. In still a further preferred embodiment, the included angle between two adjacent radial deflectors at the center of outer boundary of the flat base plate with four equal triangular protrusions is 15-20°. Such setting can divide the gas into numerous flows of uniform velocity to minimize whirlpool produced by the gas above the distributor.

In a preferred embodiment, the flat base plate with four equal triangular protrusions and flat seal plate with four equal triangular protrusions are mutually parallel, which have the same profile of outer boundary. Such setting can prevent absorbent on the upper end of the packing tower from coming into the gas intake pipe.

In a preferred embodiment, the radial deflector is a rectangular plate of equal height; the radial width of the radial deflector along the outlet of the gas intake pipe is equal to the distance between outlet boundary of gas intake pipe and outer boundary of the flat base plate with four equal triangular protrusions. Such setting of radial deflector can improve diversion efficiency of the deflector to divide the gas into numerous flows of uniform velocity to the maximum.

In a preferred embodiment, the range of axial height h of the radial deflector along outlet of the gas intake pipe is $0.65d \leq h \leq 3d$; wherein; d refers to diameter of gas intake pipe. It is applicable to realize quick diversion of the gas passing through the gas intake pipe through adjustment to interrelation between axial height h and diameter d of the gas intake pipe.

In a preferred embodiment, the distance $\Delta$ between the flat base plate with four equal triangular protrusions along the radial direction of outlet of the gas intake pipe and the wall of square packed tower is equal. Such setting aims to ensure equal radial distance between gas outlet and wall surface of the tower so as to make the gas passing through the radial deflector uniformly flow to and collide with the tower wall before turning to the tower top, prevent gas bias on the wall surface and at the corner, and reduce the resistance.

In a preferred embodiment, the range of distance $\Delta$ between the outer boundary of flat base plate with four equal triangular protrusions along radial direction of outlet of the gas intake pipe and the wall of square packed tower is 0.4~0.9 (a-d); wherein, a refers to side length of the cross section of the square packed tower; d refers to diameter of gas intake pipe. This has further minimized whirlpool produced by the gas above the distributor, improved gas phase uniformity, and reduced resistance loss.

In a preferred embodiment, a waterproof ring is provided at the interconnection between the flat base plate with four equal triangular protrusions and outlet of gas intake pipe. The waterproof ring can effectively prevent absorbent from coming into the gas intake pipe.

In still a further preferred embodiment, height of the waterproof ring is 50-100 mm.

In a preferred embodiment, a demister is provided at the flue gas outlet on the square packed tower.

In a preferred embodiment, the initial absorbent distributor comprises a distribution pipe for incoming absorbent, a primary chute on the lower end of the distribution pipe and a secondary chute on the lower end of the primary chute. The primary chute is provided with a buffer chute used to collect absorbent flowing downwards from the distribution pipe. The primary chute is also provided with an overflow hole at its bottom. The secondary chute is provided with an overflow chute used to collect absorbent flowing downwards from the overflow hole. A flow baffle is provided on either side of the overflow chute.

In a preferred embodiment, the vertical plate packing is formed by numerous mutually piled packing sheets with supporting diversion drum on the upper end. The packing sheet is provided with a diversion chute penetrating through it. The diversion chute is located at the lower side of the supporting diversion drum. A diversion window is provided on the external side of the diversion chute.

The vertical plate packing belongs to regular packing formed by numerous packing sheets through mutual piling according to tower diameter. The adjacent packing sheets are pressed against the supporting diversion drum to form a top structure for diversion of absorbent so as to eliminate impact from liquid phase unevenness to the packing on upper layer, and improve film forming rate of absorbent on the surface of packing sheets. The vertical plate packing is in the structure of vertical plate with less pressure loss to gas phase, which can improve poor fluidity of $CO_2$ absorbent of high viscosity. Furthermore, a diversion window structure is provided at its lower part to facilitate transverse dispersion of gas phase, and reduce the pressure loss. The vertical plate packing is provided with a rhombic diversion chute at its lower part to facilitate formation of double-side liquid film, enhancement of turbulence performance of absorbent and improvement of mass transfer efficiency.

In an improved embodiment, the packing sheet is made of PP plate through pressing.

In an improved embodiment, the packing sheets are mutually paralleled, and the position of diversion chutes on adjacent packing sheets is staggered to facilitate installation inside packing tower and increase of specific area.

In an improved embodiment, a top of the diversion window is in contact with adjacent packing sheets to facilitate transverse dispersion of gas phase and minimization of pressure loss.

In an improved embodiment, the supporting diversion drum shapes like a prism; the area of all supporting diversion drums on upper end of one side of the packing sheet accounts for ⅙~¼ lateral area of the packing sheet. In still a further preferred embodiment, the supporting diversion drum shapes like a frustum of rectangular pyramid with height up to 2-10 mm; the drum forms an angle of 20~60° in vertical direction. Such setting can minimize amplification effect incurred by heterogeneity when the absorbent from the top flows downwards.

In an improved embodiment, the supporting diversion drums are in a staggered arrangement on both sides of the packing sheet.

In an improved embodiment, the supporting diversion drum shapes like a convex prism on one side of the packing sheet and a concave prism on the other side.

In an improved embodiment, the space between each diversion chute on the packing sheet is equal, namely 5-15 mm.

In an improved embodiment, the diversion chute is a rhombic diversion chute. In still a further preferred embodiment, the diversion chute is in square form with side length up to 4-10 mm.

In an improved embodiment, the diversion window is formed by two symmetrical deflectors; the two deflectors are respectively arranged on the lower edge of the rhombic diversion chute to form an upward opening. Setting of such diversion window can divert absorbent to two lateral sides of the packing sheet along the diversion window to further increase the specific area, and minimize pressure drop.

In an improved embodiment, the diversion windows are in staggered arrangement on two sides of the packing sheet.

In an improved embodiment, an inter-stage cooler and a regular packing are provided between the vertical plate packing and radial diversion gas distributor; the regular packing is arranged between the cooler shell and the wall of square packed tower.

In a preferred embodiment, the inter-stage cooler comprises a shell and numerous heat exchange plate pairs; the heat exchange plate pair is mutually piled inside the shell; the heat exchange plate pair comprises two symmetrical heat exchange plates.

A heat exchange channel is provided between two symmetrical heat exchange plates in the heat exchange plate pair. The shell is accordingly provided with a coolant inlet and outlet connected with the heat exchange channel. A flue gas absorption channel is provided between two adjacent heat exchange plate pairs. The shell is accordingly provided with a flue gas inlet and an absorbent inlet connected with the flue gas absorption channel. A projection and a flute are respectively provided on two sides of the heat exchange plate.

The inter-stage cooler is normally installed at the central or lower part of the flue gas absorption tower; as mass transfer inside the flue gas absorption tower mainly takes place on the top of the absorption tower, it may result in extremely high temperature of absorbent reaching the bottom of the absorption tower; this may further result in low absorption load and reduced mass transfer efficiency. With the deployment of inter-stage cooler, it is applicable to control the temperature of absorbent to ensure the most appropriate absorption temperature, and improve mass transfer efficiency.

Secondly, the projection and flute on two sides of the heat exchange plate can increase the contact area for liquid phase mass transfer, and play a role of diversion. As the absorbent may form a liquid film on the external side of the heat exchange plate, the projection and flute can make the liquid film uniformly distribute on the external side of the heat exchange plate to prevent local liquid film from excessive thickness which will reduce mass transfer efficiency.

In an improved embodiment, the flute is formed by the projection on the other side; height of the projection and flute is 2-10 mm. Such setting can facilitate preparation of the heat exchange plate, and further increase the contact area for liquid phase mass transfer at the same time. In still a further improved embodiment, the projection is a semicircle projection.

In an improved embodiment, the heat exchange plate belongs to stainless steel plate with thickness up to 0.4-2 mm.

In an improved embodiment, lower and upper ends of the heat exchange plate in the heat exchange plate pair are provided with an internally sealed hem as connected with another heat exchange plate. The two symmetrical heat exchange plates are mutually sealed via lower and upper ends of the internally sealed hem for connection with coolant inlet and outlet on the shell to form a heat exchange channel.

In still a further improved embodiment, the section of the internally sealed hem shapes like a Z to facilitate installation and fixing.

In an improved embodiment, the shell is provided with a toothed groove at the flue gas inlet and absorbent inlet for fixing of internally sealed hem. The toothed groove aims to fix the internally sealed hem to make the heat exchange plate pair form an enclosed heat exchange channel, which can facilitate installation and disassembly of heat exchange plate pair inside the shell.

In an improved embodiment, left and right sides of heat exchange plate in the heat exchange plate pair is used to connect externally sealed hem of adjacent heat exchange plate pairs. Left and right sides of two adjacent heat exchange plate pair are mutually sealed by the externally sealed hem to form a flue gas absorption channel in together with flue gas inlet and absorbent inlet on the shell, and thereby realize separation of flue gas absorption channel and heat exchange channel.

In an improved embodiment, a section of the externally sealed hem shapes like a Z. Such setting can facilitate installation and fixing; furthermore, the externally sealed hem can also divert the absorbent.

In an improved embodiment, space and geometric specific area of the flue gas absorption channel is 4~20 mm and 80~300 $m^2/m^3$ respectively.

In an improved embodiment, the projection and flute are in staggered arrangement in proper sequence to further enhance the diversion of absorbent.

In an improved embodiment, projection on the heat exchange plate is fixed to that on the adjacent heat exchange plate. Such setting can ensure an overall rigidity; meanwhile, the mutually fixed projections can also realize diversion of absorbent to further ensure uniform distribution of absorbent.

In a preferred embodiment, a corrugated packing layer is provided between the inter-stage cooler and radial diversion gas distributor. In still a further preferred embodiment, it is the corrugated packing layer made of perforated PP plate of high liquid phase mass transfer coefficient.

In a preferred embodiment, an absorbent collector and re-distributor are provided between the vertical plate packing and inter-stage cooler.

The absorbent collector and re-distributor comprise an absorbent collection plate, an absorbent collector on the lower end of the absorbent collection plate, a distribution pipe connected with the absorbent collector, a primary chute on the lower end of the distribution pipe, a secondary chute on the lower end of the primary chute. The primary chute is provided with a buffer chute used to collect absorbent flowing down from the distribution pipe. The primary chute is also provided with an overflow hole at its bottom. The secondary chute is provided with an overflow chute used to collect absorbent flowing down from the overflow hole. A flow baffle is provided on either side of the overflow chute.

In a preferred embodiment, the square packed tower is composed of the main structure of reinforced concrete and antiseptic FRP liner; the corbel embedded in the tower body is connected with aforesaid parts inside the tower.

In a preferred embodiment, the vertical plate packing and corrugated packing layer are installed inside the square packed tower by means of supporting grid and truss beam.

As compared with prior arts, the present invention has the following beneficial effects:

(1) The square packed tower provided by the present invention is provided with a radial diversion gas distributor that can minimize whirlpool produced by flue gas $CO_2$ above the distributor, improve gas phase uniformity, and minimize resistance loss;

(2) The square packed tower according to the present invention is provided with a vertical plate packing, packing sheets, a diversion chute and a diversion window to form a mass transfer channel; under the joint action of the three, absorbent passing through the supporting diversion drum may produce an interlaced small corrugation on both sides of the packing sheet to increase the specific area, and minimize pressure drop;

(3) The square packed tower according to the present invention is provided with an inter-stage cooler that can control the temperature of absorbent to ensure the most appropriate absorption temperature, and improve mass transfer efficiency;

(4) The square packed tower according to the present invention adopts the reinforced concrete tower body to reduce manufacturing cost of flue gas $CO_2$ collection equipment.

Wherein, 1. square packed tower; 101. flue gas outlet; 102. demister; 103. the first mounting bracket; 104. the second mounting bracket; 105. enrichment liquid outlet; 2. initial absorbent distributor; 201. distribution pipe; 202. primary chute; 203. secondary chute; 204. buffer chute; 205. overflow hole; 206. overflow chute; 207. flow baffle; 3. vertical plate packing; 301. packing sheet; 302. supporting diversion drum; 303. diversion window; 304. rhombic diversion chute; 305. deflector; 4. absorbent collector and re-distributor; 401. absorbent collection plate; 402. absorbent collector; 403. reservoir; 404. absorbent re-distribution inlet; 405. distribution pipe; 406. primary chute; 407. secondary chute; 5. inter-stage cooler; 501. shell; 502. heat exchange plate; 503. absorbent inlet; 504. flue gas inlet; 505. coolant inlet. 506. coolant outlet; 507. toothed groove; 508. cooling channel; 509. flue gas absorption channel; 510. internally sealed hem; 511. external sealed hem; 512. projection; 513. flute; 6. corrugated packing layer; 7. radial diversion gas distributor; 701. gas intake pipe; 702. flat base plate with four equal triangular protrusions; 703. flat seal plate with four equal triangular protrusions; 704. radial diversion plate; 705. support beam; 706. waterproof ring; 707. gas intake pipe outlet; 708. gas intake pipe inlet.

DETAILED EMBODIMENTS OF THE PRESENT INVENTION

The present invention is described as follows in combination embodiments and drawings to specifications.

Embodiments

Figure 1:
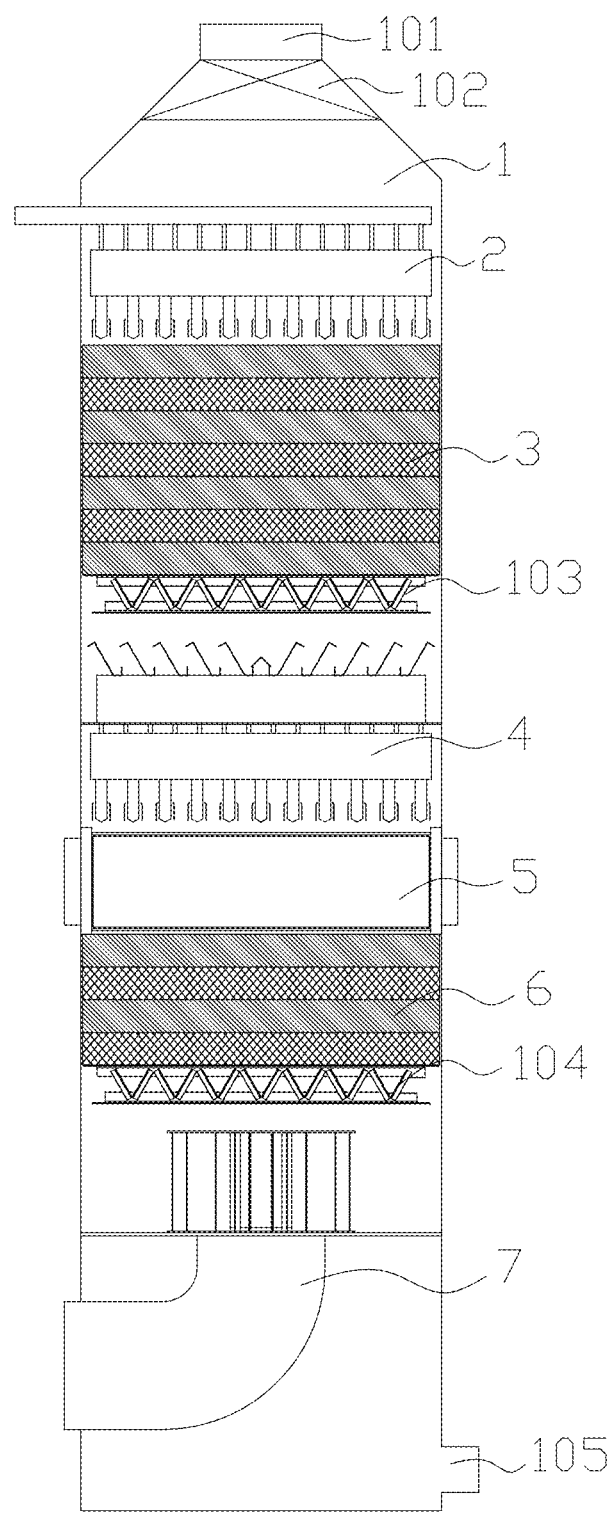
FIG. 1 is the structural diagram for the square packed tower in embodiments.

As shown in FIG. 1, a square packed tower 1 is composed of a reinforced concrete main structure and an FRP antiseptic liner. The square packed tower 1 is installed with a demister 102, an initial absorbent distributor 2, a vertical plate packing 3, the first mounting bracket 103, an absorbent collector and re-distributor 4, an inter-stage cooler 5, a corrugated packing layer 6, the second mounting bracket 104 and a radial diversion gas distributor 7 in a proper sequence from the top to the bottom.

A flue gas outlet 101 is provided on the top of square packed tower 1. An enrichment liquid outlet 105 is provided at the tower bottom. A demister 102 is installed at the flue gas outlet 101 of the square packed tower 1.

Figure 2:
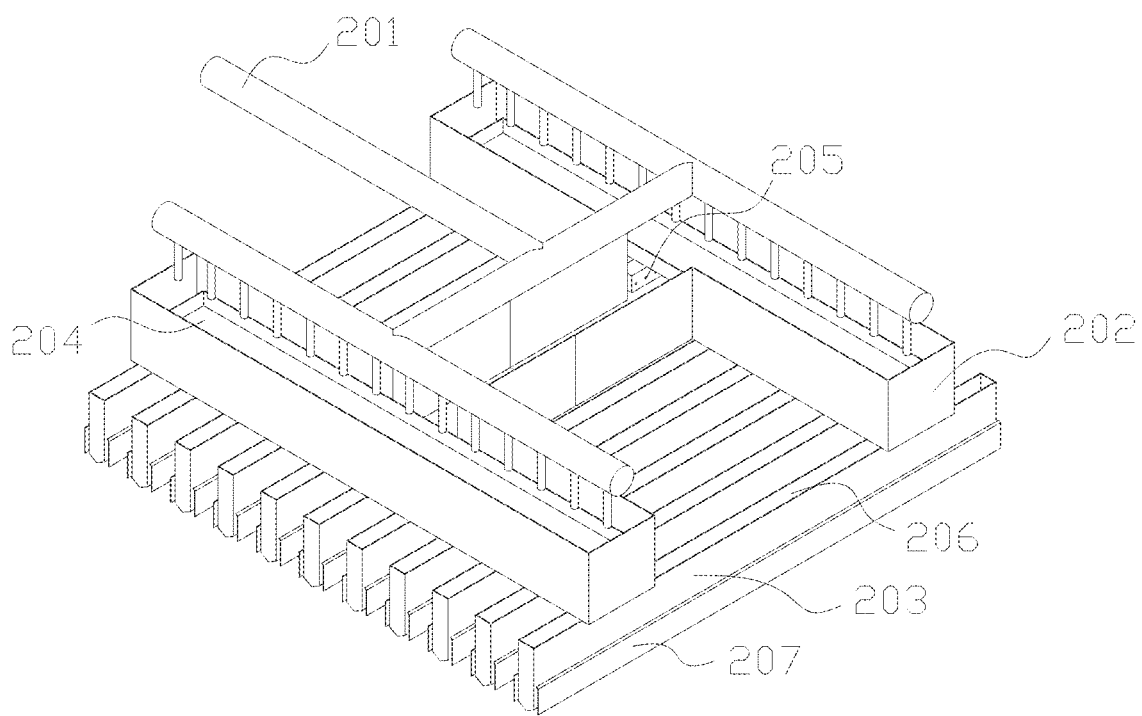
FIG. 2 is the structural diagram for initial absorbent distributor in embodiments.

As shown in FIG. 2, initial absorbent distributor 2 comprises an absorbent distribution pipe 201, a primary chute 202 on the lower end of the distribution pipe 201 and a secondary chute 203 on the lower end of the primary chute 202. An absorbent inlet of distribution 201 extends outside of the square packed tower 1 to facilitate supply of absorbent. A primary chute 202 is in H shape with overall dimension exceeding that of distribution pipe 201; whereas, a buffer chute 204 used to collect absorbent flowing down from distribution pipe 201 is provided inside the primary chute 202. The primary 202 is also provided with an overflow hole 205 at its bottom. The secondary chute 203 is provided with an overflow chute 206 used to collect absorbent flowing down from overflow hole 205. The overflow chute 206 is a strip in parallel arrangement. Meanwhile, a flow baffle 207 is provided on either side of each overflow chute 206.

Figure 3:
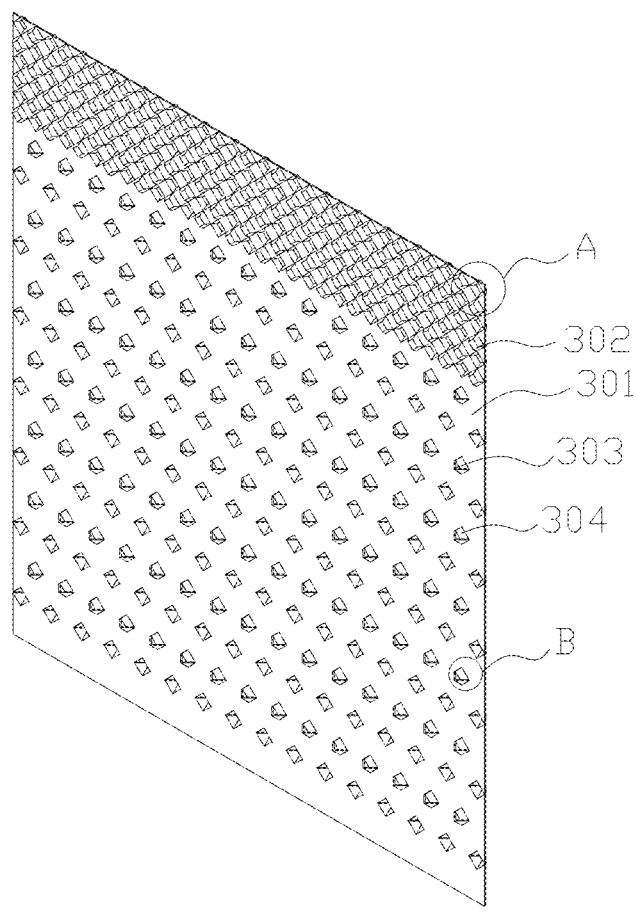
FIG. 3 is the structural diagram for packing sheets in the vertical plate packing in embodiments.
Figure 4:
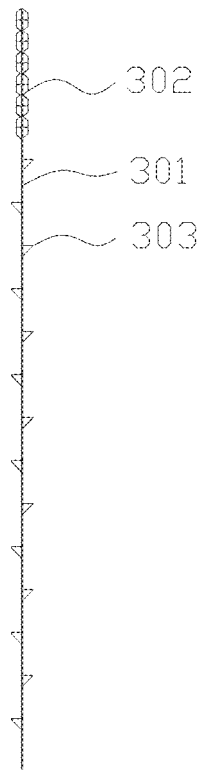
FIG. 4 is the right view of packing sheets in the vertical plate packing in embodiments.

As shown in FIGS. 3 and 4, a vertical plate packing 3 is formed by numerous packing sheets 301 in parallel arrangement; the vertical plate packing 3 is installed on the lower end of the square packed tower; only one packing sheet 301 is illustrated in the figure. The packing sheet 301 is in rectangle form, which is made of PP; its profile is determined by the square packed tower 1.

Figure 5:
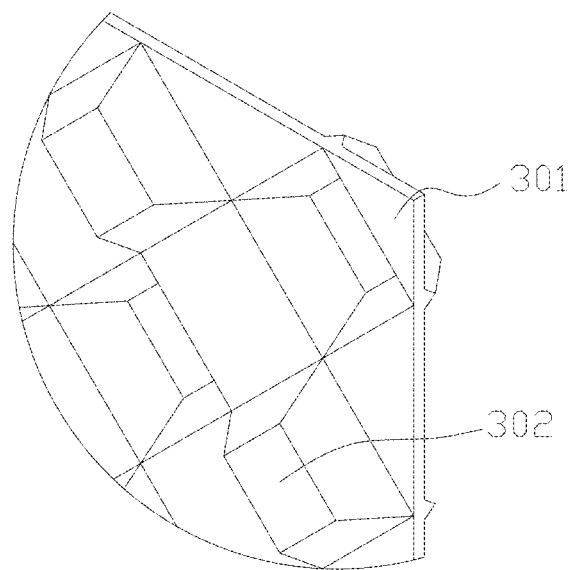
FIG. 5 is the enlarged view of Area A in FIG. 3.

As shown in FIG. 5, a supporting diversion drum 302 is provided on both sides of the lower end of a packing sheet 301. The supporting diversion drum 302 shapes like a prism with drum height up to 4 mm. The drum forms an angle of 45° in vertical direction, of which geometric specific area is 275 m2/m3. The supporting diversion drum 302 is in staggered arrangement on both sides of upper end of the packing sheet 301. It shapes like a convex prism on one side of the packing sheet 301 and a concave prism on the other side. All supporting diversion drums 302 on upper end of one side of the packing sheet 301 accounts for ⅕ lateral area of the packing sheet 301.

The vertical plate packing 3 is formed by means of mutual fixing and piling of prisms of the supporting diversion drum 302 on the packing sheet 301; a diversion structure is formed between two supporting diversion drums 302 as mutually fixed to ensure uniform distribution of absorbent coming into a vertical plate packing 3, and improve the film forming rate.

Figure 6:
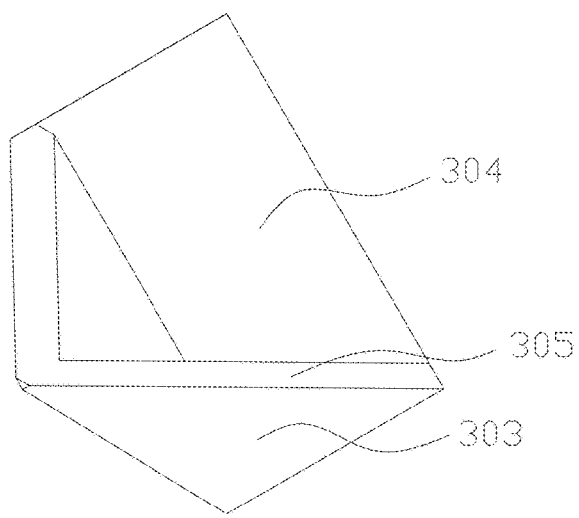
FIG. 6 is the enlarged view of Area B in FIG. 3.

As shown in FIG. 6, the packing sheet 301 is also provided with a rhombic diversion chute 304 penetrating through the packing sheet 301. A rhombic diversion chute 304 is a square with side length up to 6 mm. The rhombic diversion chutes 304 are in staggered arrangement on packing sheet 301 in rows. As a result of it, the space between two adjacent rhombic diversion chutes 304 is the same, namely 10 mm. The rhombic diversion chute 304 is located at lower part of supporting the diversion drum 302.

As the diversion chute 304 between two adjacent packing sheets 301 is provided at different positions, the vertical plate packing 3 is formed by two packing sheets 301 of different profile. The rhombic diversion chutes 304 on the adjacent packing sheet 301 are mutually staggered for positioning; whereas height of the supporting diversion drum 302 is equivalent to 50% of that of the diversion window 303. As a result of it, the top of the diversion window 303 is in contact with the adjacent packing sheet 301.

The diversion window 303 is provided on the edge of rhombic diversion chute 304, which are in staggered arrangement on both sides of the packing sheet 301 in proper sequence. The diversion window 303 comprises two symmetrically arranged deflectors 305. The deflector 305 is in triangular form. Two deflectors 305 are arranged at the lower part of rhombic diversion chute 304 to form an upward opening. The packing sheet 301, rhombic diversion chute 304 and diversion window 303 form a mass transfer channel; under the joint action of the three, absorbent passing through the supporting diversion drum 302 may produce an interlaced small corrugation on both sides of the packing sheet to increase the specific area, minimize pressure drop and reduce the manufacturing cost.

The vertical plate packing 3 penetrates through and is fixed and installed inside the first mounting bracket 103; the first mounting bracket 103 comprises supporting grid and truss beam.

Figure 7:
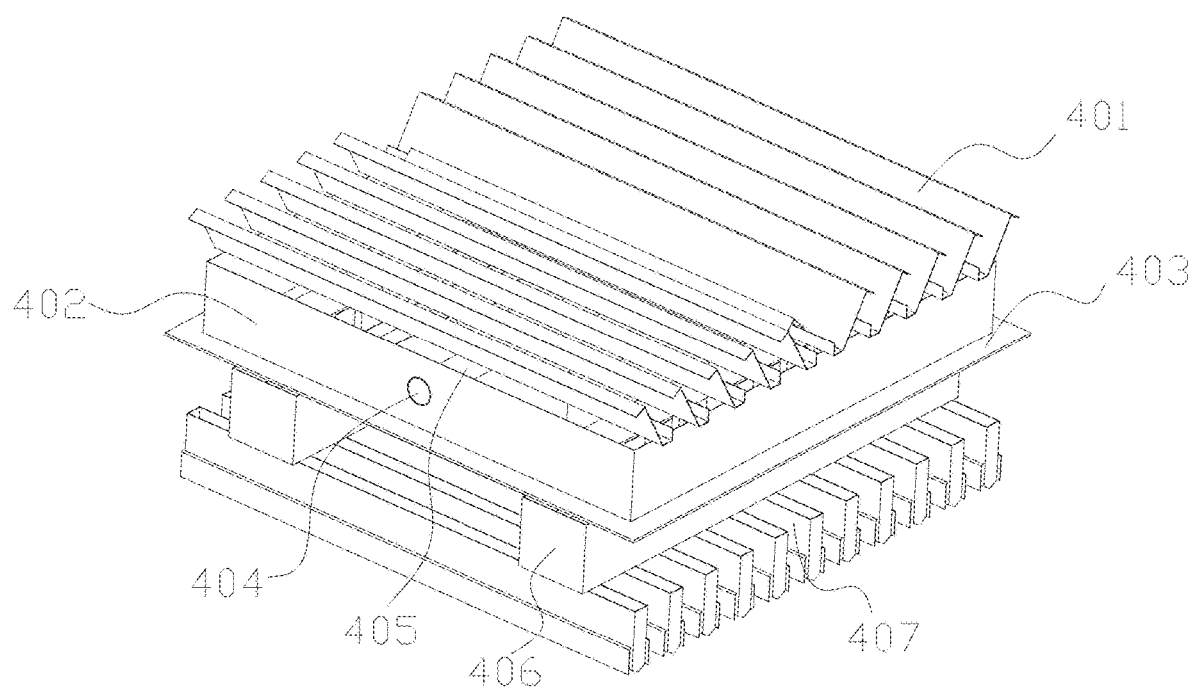
FIG. 7 is the structural diagram for the absorbent collector and re-distributor in embodiments.

As shown in FIG. 7, the absorbent collector and re-distributor 4 comprises an absorbent collection plate 401, an absorbent collector 402 on the lower end of absorbent collection plate 401, a distribution pipe 405 connected with absorbent collector 402, a primary chute 406 on the lower end of distribution pipe 405 and a secondary chute 407 on the lower end of primary chute 406. As the structure of distribution pipe 405 connected with absorbent collector 402, the structure of lower primary chute 406 and secondary chute 407 is the same as that in initial absorbent distributor 2, it is not to be described here in details. A periphery of absorbent collector 402 and tower wall form a reservoir chute 403; as absorbent collection plate 401 shapes like a Z, and lower hem is provided with a diversion chute, absorbent is to be diverted to the reservoir chute 403; accompanied by rise of liquid level, absorbent will come into distribution pipe 405 once again.

Figure 8:
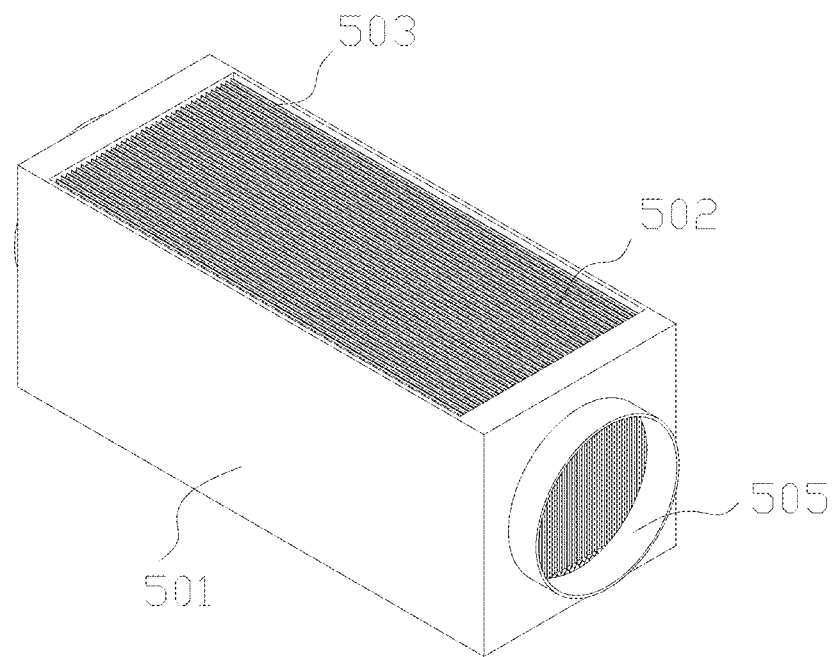
FIG. 8 is the structural diagram for the inter-stage cooler in embodiments.

As shown in FIG. 8, an inter-stage cooler 5 is installed at central or lower part of square packed tower 1. The inter-stage cooler 5 comprises a shell 501 and numerous heat exchange plate pairs; regular packing is provided between the shell 501 of inter-stage cooler and the wall of packing tower 1 to fill in the clearance (not indicated in the figure). The heat exchange plate pairs are mutually piled inside shell 501. Each heat exchange plate pair comprises two symmetrical heat exchange plates 502. The heat exchange plate 502 is stainless steel plate with thickness up to 1 mm.

Figure 9:
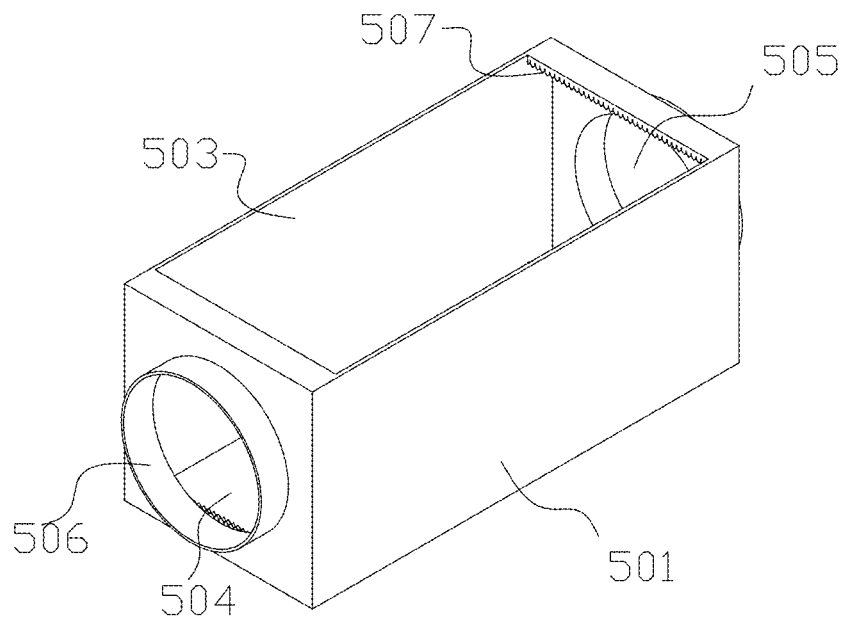
FIG. 9 is the structural diagram for the inter-stage cooler shell in embodiments.
Figure 10:
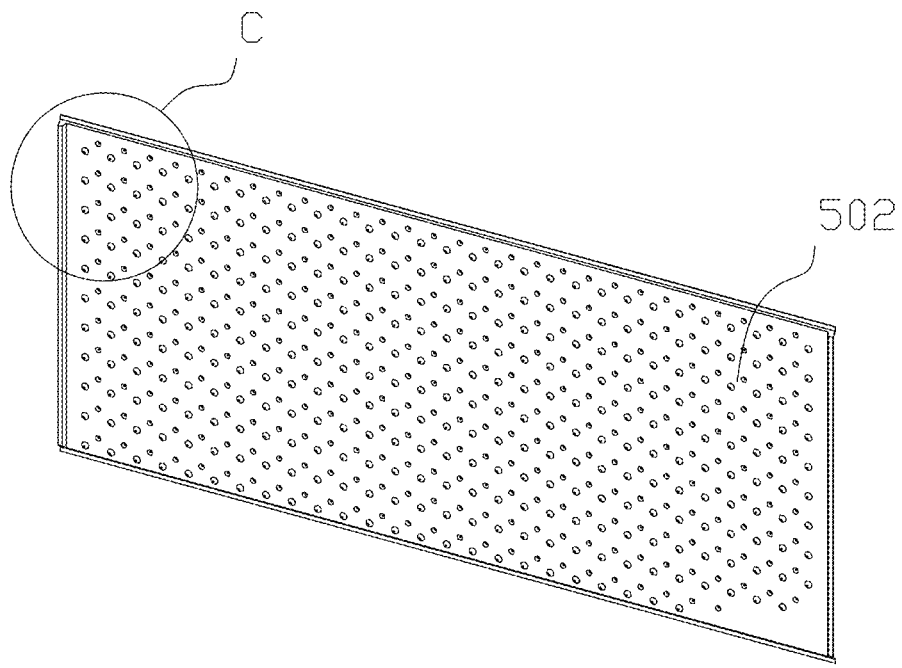
FIG. 10 is the structural diagram for the heat exchange plate in embodiments.
Figure 11:
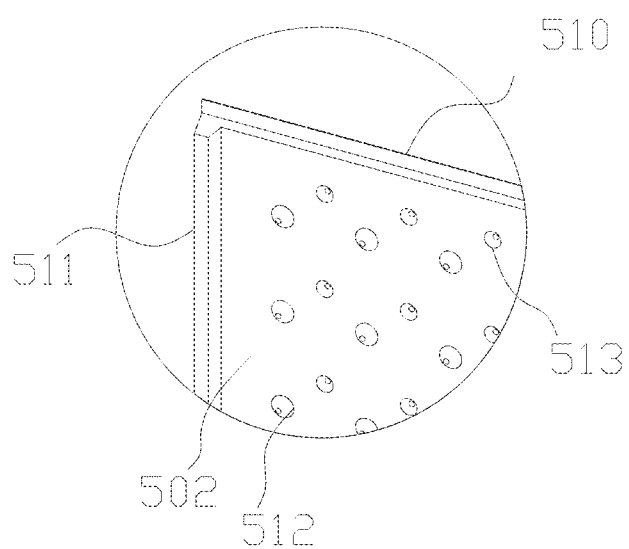
FIG. 11 is the enlarged view of Area C in FIG. 10.
Figure 12:
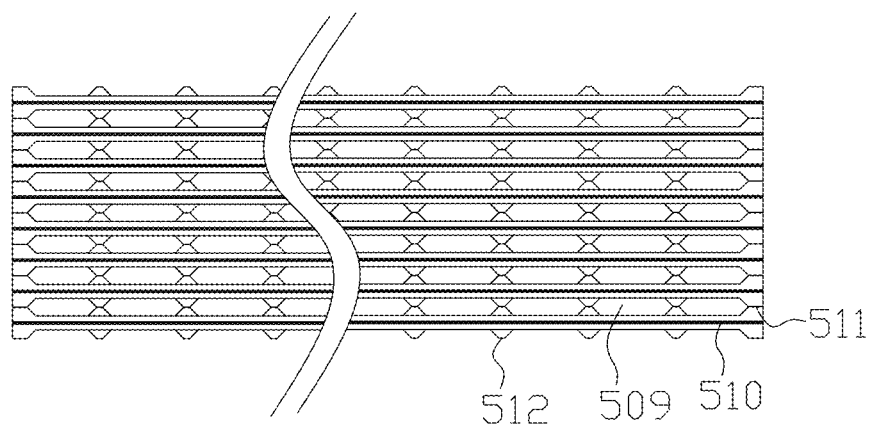
FIG. 12 is the right view of local heat exchange plate pairs in embodiments.
Figure 13:
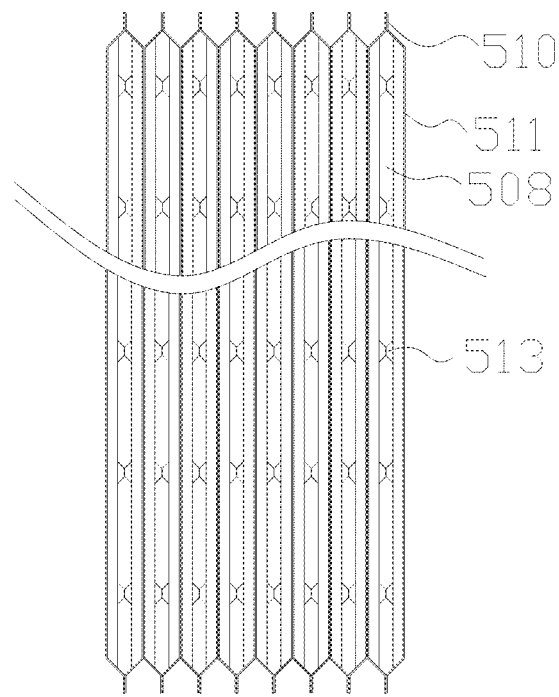
FIG. 13 is the vertical view of local heat exchange plate pairs in embodiments.

As shown in FIG. 9, a shell 501 is a rectangle, of which profile is determined by a square packed tower 1. The lower and upper sides of the shell 501 are provided with openings. The opening on the upper side serves as absorbent inlet 503 and flue gas outlet; whereas the opening on the lower side serves as flue gas inlet 504 and absorbent outlet. A circular opening is provided on the left and right sides of shell 501, respectively; the circular opening on the right side serves as the coolant inlet 505; whereas the circular opening on the left side serves as the coolant outlet 506; left and right circular openings are installed on the wall of square packed tower 1 for connection of circulating cooling water.

As shown in FIG. 10-13, the heat exchange plates 502 in inter-stage cooler 5 have the same profile and size. Two symmetrical heat exchange plates 502 form a heat exchange plate pair by means of parallel installation; whereas heat exchange plate pairs are piled inside shell 501 in proper sequence; installation direction of heat exchange plate pairs is vertical to upper and lower openings on shell 501 as well as left and right circular openings on shell 501.

A projection 512 and a flute 513 are provided on both sides of the heat exchange plate 502. The flute 513 is formed by the projection 512 on the other side, and the height of the projection 512 and the flute 513 is 4 mm. The first row of flute 513 is provided on the external side of the heat exchange plate 502 at intervals; whereas the second row is provided with projection 512; they are in staggered arrangement in this sequence. The projection 512 on heat exchange plate 502 is fixed to that on adjacent heat exchange plate 502; in such case, the height of the projection 512 on the external side of the heat exchange plate 502 is equal to that of externally sealed hem 511. Furthermore, the height of the flute 513 on the internal side of heat exchange plate 502 is also equal to that of internally sealed hem 510. The projection 512 as mutually fixed also aims to divert absorbent, and further ensure uniform distribution of absorbent.

The upper and lower ends of heat exchange plate 502 in heat exchange plate pair are respectively provided with an internally sealed hem 510 as connected to another heat exchange plate 502. Two symmetrical heat exchange plates 502 are mutually sealed via upper and lower ends of internally sealed hem 510 to form a cooling channel 508 in together with the coolant inlet 505 and outlet 506 on the shell 501. A section of internally sealed hem 510 shapes like a Z; whereas the shell 501 is provided with a toothed groove 507 at the flue gas inlet 504 and absorbent inlet 503 to fix internally sealed hem 510. The toothed groove 507 aims to fix the internally sealed hem 510 to make the heat exchange plate pair form an enclosed heat exchange channel 508, which can facilitate installation and disassembly of heat exchange plate pair inside the shell 501.

The left and right sides of heat exchange plate 502 in the heat exchange plate pair is installed with the externally sealed hem 511 which is to interconnect adjacent heat exchange plate pairs. Section of the externally sealed hem 511 is in Z-shape, which can be used to divert absorbent. Two adjacent heat exchange plate pairs are mutually sealed by the externally sealed hem 511 to form a flue gas absorption channel 509 in together with flue gas inlet 504 and absorbent inlet 503 on the shell 501; space and geometric specific area of the flue gas absorption channel is 12 mm and 190 m²/m³ respectively; this aims to realize separation of flue gas absorption channel 509 and cooling channel 508.

A corrugated packing layer 6 is installed on the lower end of inter-stage cooler 5. The corrugated packing layer 6 belongs to corrugated PP packing layer with high liquid phase mass transfer coefficient. Meanwhile, corrugated packing layer is fixed to the square packed tower 1 via the second mounting bracket 104; the second mounting bracket 104 comprises a supporting grid and a truss beam.

Figure 14:
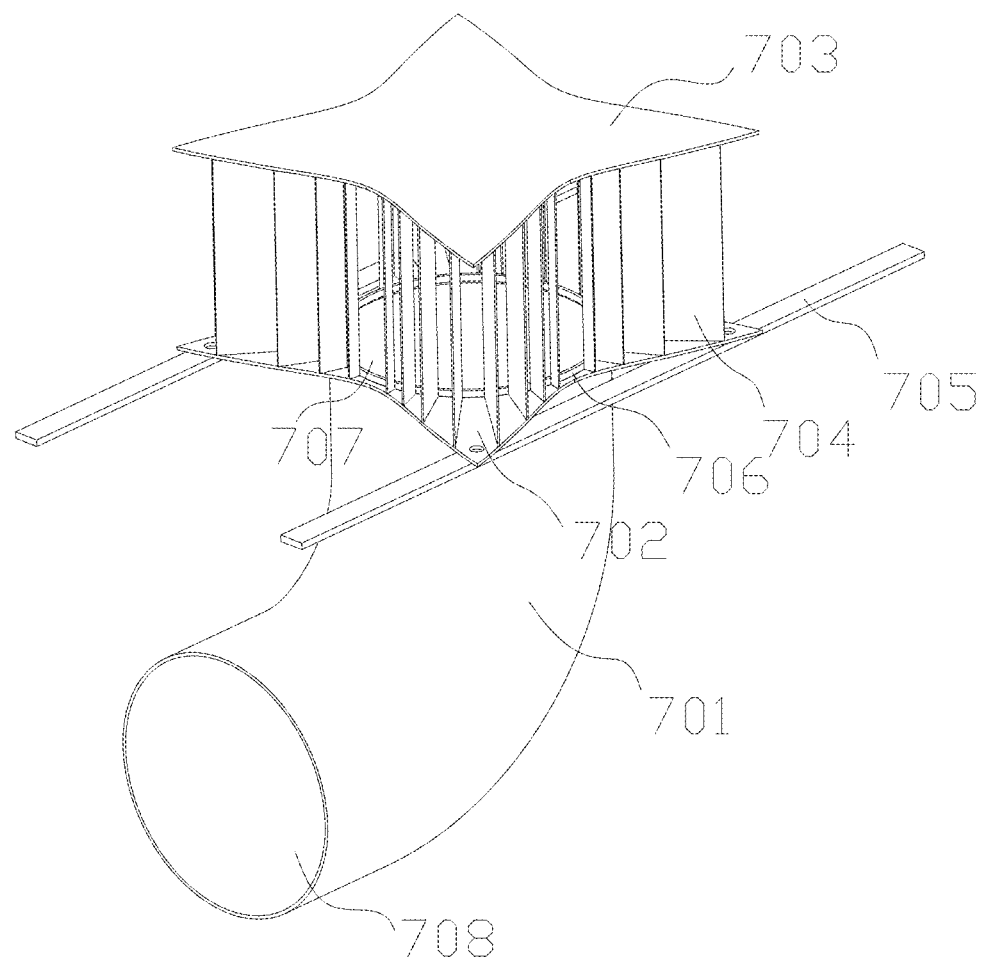
FIG. 14 is the structural diagram for the radial diversion gas distributor in embodiments.
Figure 15:
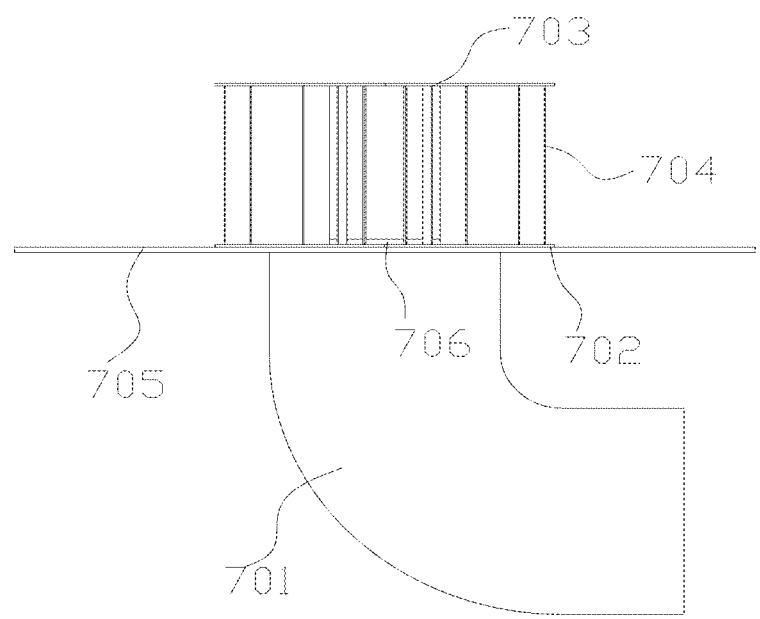
FIG. 15 is the right view of the radial diversion gas distributor in embodiments.
Figure 16:
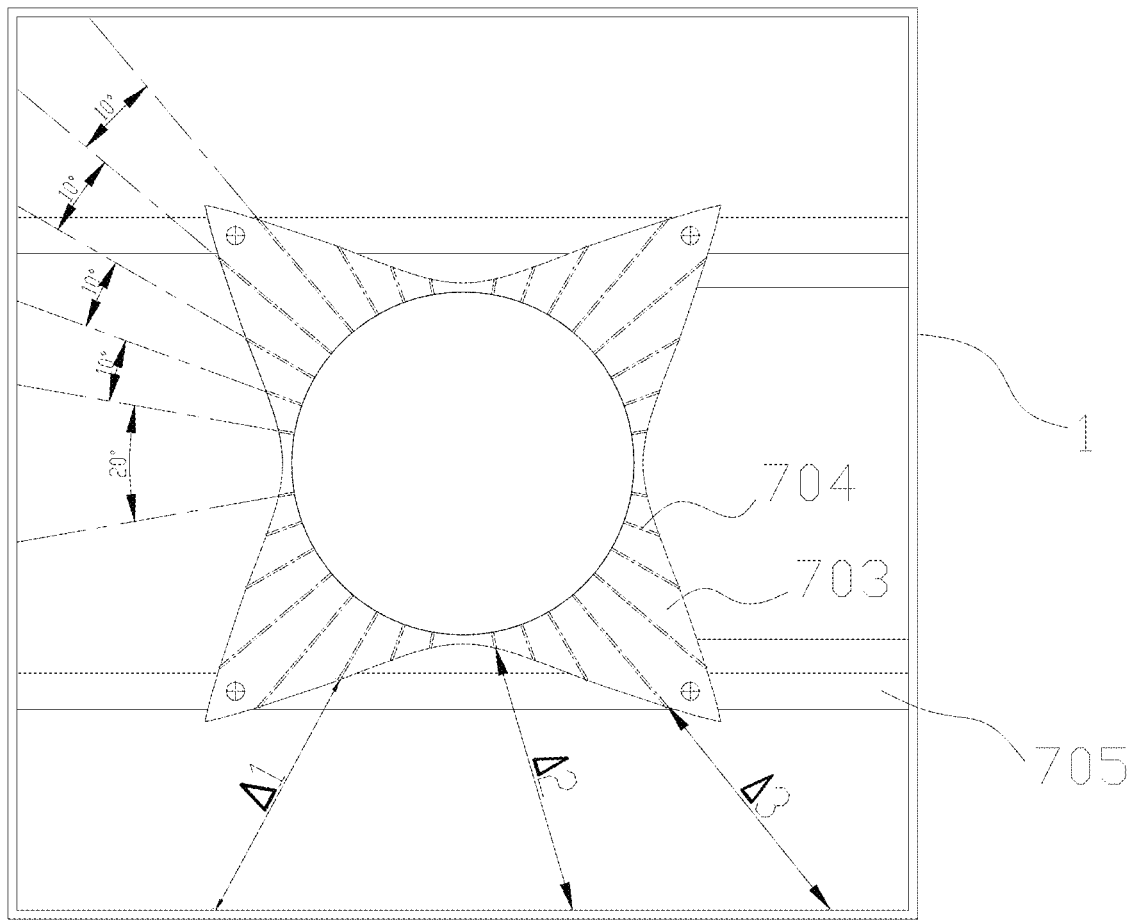
FIG. 16 is the vertical view of radial diversion gas distributor installed inside the square packed tower in embodiments.

As shown in FIG. 14-16, the radial diversion gas distributor 7 comprises a gas intake pipe 701, a flat base plate with four equal triangular protrusions 702, a flat seal plate with four equal triangular protrusions 703 and numerous radial deflectors 704.

The radial diversion gas distributor 7 is installed inside packing tower 1. The gas intake pipe 701 is a 90° elbow with diameter d=760 mm. The inlet 708 of the gas intake pipe is fixed to the tower wall on one side of packing tower 1; whereas the outlet 707 of the gas intake pipe is welded to the flat base plate with four equal triangular protrusions 702 to interconnect the gas intake pipe 701 and flat base plate with four equal triangular protrusions 702. Four corners of flat base plate with four equal triangular protrusions 702 are fixed to two supporting beams 705 by threads; whereas supporting beam 705 is fixed to the corbel structure on the wall of packing tower 1 (not indicated in the figure) to fix the whole distributor. A waterproof ring 706 is provided at interconnection between flat base plate with four equal triangular protrusions 702 and the outlet 707 of the gas intake pipe. The height of the waterproof ring 706 is 75 mm.

As shown in FIG. 16, the outlet 707 of gas intake pipe is located at the center of square packed tower 1; whereas the flat base plate with four equal triangular protrusions 702 is also provided at the center of square packed tower 1.

The radial deflector 704 is arranged between flat base plate with four equal triangular protrusions 702 and flat seal plate with four equal triangular protrusions 703 in radial direction along the outlet 707 of the gas intake pipe. The radial deflector 704 is located on the edge of boundary of the outlet 707 of the gas intake pipe, which is vertical to the tangent line of boundary of the outlet 707 of the gas intake pipe. Furthermore, the center of profile formed by all diversion deflectors 704 is symmetrical to that of the outlet 707 of the gas intake pipe; wherein, flat base plate with four equal triangular protrusions 702 and flat seal plate with four equal triangular protrusions 703 are parallel, which have the same boundary profile. The radial deflector 704 shapes like a rectangular plate of equal height, of which height and quantity is 1.5d and 32 respectively. The radial deflector 704 is fixed between flat base plate with four equal triangular protrusions 702 and flat seal plate with four equal triangular protrusions 703 vertically by means of welding. Included angle between two radial deflectors 704 at the center of four outer boundaries of flat base plate with four equal triangular protrusions 702 is 20°. The included angle formed by other radial diversion deflectors 704 is 10°.

A radial width of radial deflector 704 along outlet 707 of the gas intake pipe is equal to the distance between the outlet 707 of the gas intake pipe and outer boundary of flat base plate with four equal triangular protrusions 702; meanwhile, the distance Δ between outer boundary of flat base plate with four equal triangular protrusions 702 along radial direction of the outlet 707 of the gas intake pipe and the wall of square packed tower 1 is equal. In FIG. 16, Δ1=Δ2=Δ3; this aims to ensure equal radial distance between gas outlet and the wall of square packed tower 1, and make the gas passing through radial deflector 704 uniformly flow to and collide with tower wall before turning to the tower top to prevent gas bias on the wall and at corners, and reduce the resistance.

Performance Test

The software Fluent is used to simulate flow distribution inside square packed tower 1 in preferred embodiments, and analyze pressure loss to the gas passing through radial diversion gas distributor 7 and gas velocity distribution inhomogeneity above radial diversion gas distributor 7.

Under such simulation condition, pressure variation to the air flowing inside radial diversion gas distributor 7 is negligible. Therefore, the air is deemed as fluid unavailable for compression. The air flows inside the tower in turbulent flow, which can be described by continuity equation, Renolds-averaged N—S equation and transport equation applicable to turbulence energy k and turbulence energy loss rate s. Gas in the intake pipe of distributor is to be considered in reference to well developed turbulent flow, of which velocity inlet boundary condition is u=8 m/s; the outlet is pressure boundary outlet; furthermore, standard wall function is used to calculate physical quantity on nearby wall grid.

1. Numerical Analysis of Resistance Loss Δp

The resistance loss Δp is defined as follows: Pressure difference to gas distributor inlet and certain section on the distributor.

$\Delta p = p_{in} - p_{out}$, in the equation, pin refers to pressure at gas distributor inlet; pout refers to pressure on certain section of distributor. As discovered through simulation, pressure loss to inlet and outlet of gas distributor is Δp=55 Pa.

2. Numerical Analysis of Gas Velocity Distribution Inhomogeneity Mf

The distribution performance of the distributor can be indicated by gas velocity distribution inhomogeneity;

$$M_f = \left[\frac{1}{n}\sum_{n=1}^{n}\left(\frac{u_i - \bar{u}}{\bar{u}}\right)^2\right]^{0.5},$$

n refers to the number of monitoring points for gas velocity on the interface above the distributor.

Figure 17:
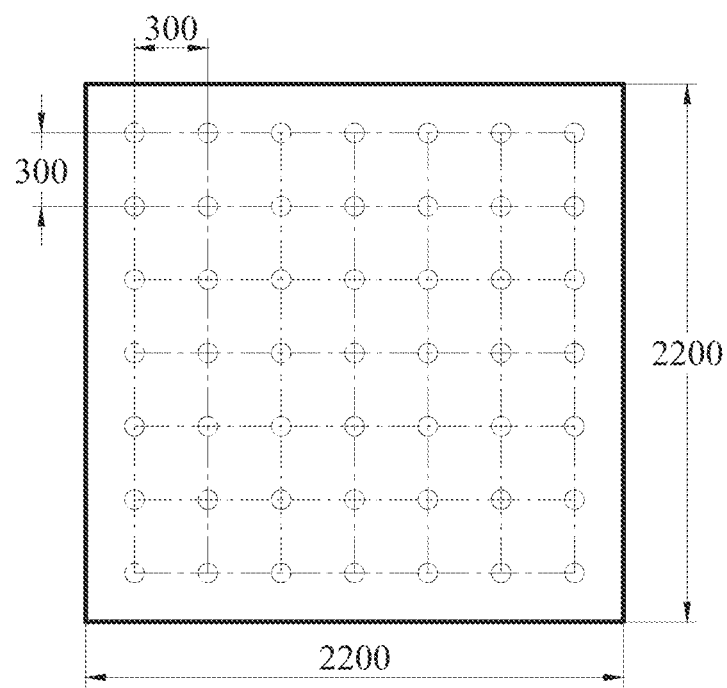
FIG. 17 is the diagram for velocity monitoring points on axial section of the radial diversion gas distributor inside the square packed tower.

Specific steps: An axial section is taken above the distributor (at the point where Z=0~1.5 m). 49 velocity monitoring points were taken at equal space on this section (refer to FIG. 17); ui refers to axial velocity of the gas distributor at point i on this section; $\bar{u}$ refers to mean value of velocity of the distributor at n velocity points on the specific section. The axial velocity is taken at 49 velocity monitoring points from the software Fluent, and uneven gas velocity Mf distribution is calculated based on aforesaid equation.

Figure 18:
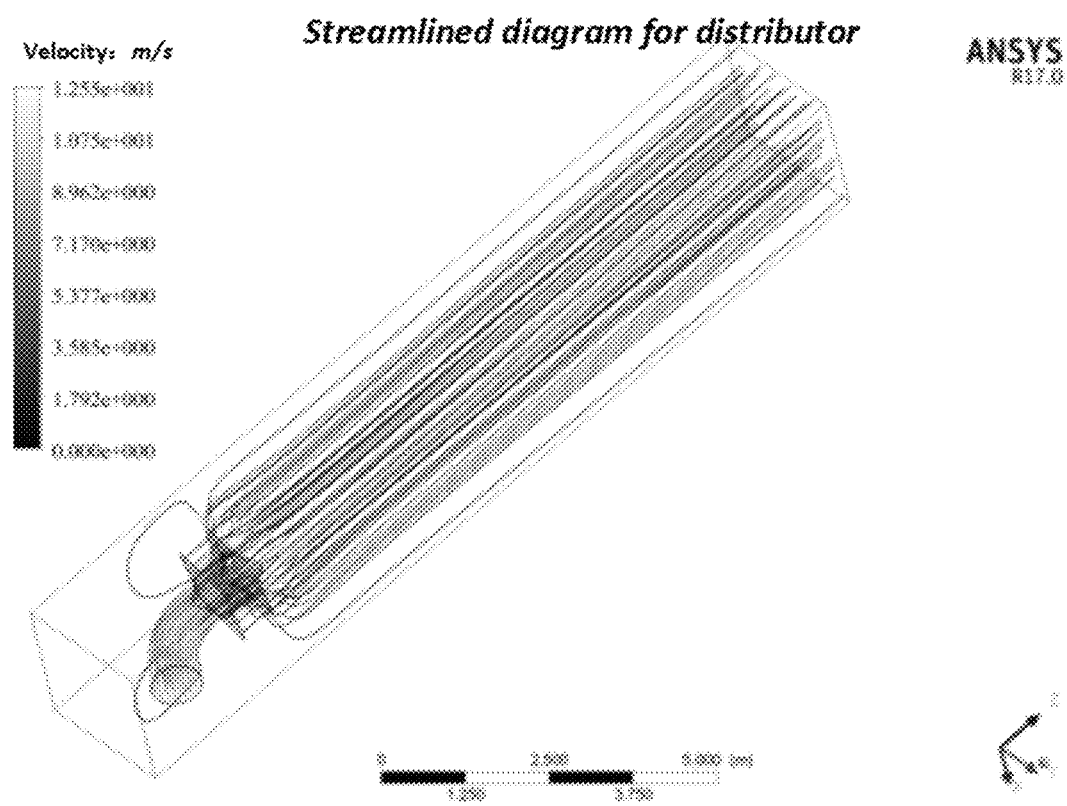
FIG. 18 is the streamlined diagram for the gas inside the square packed tower.
Figure 19:
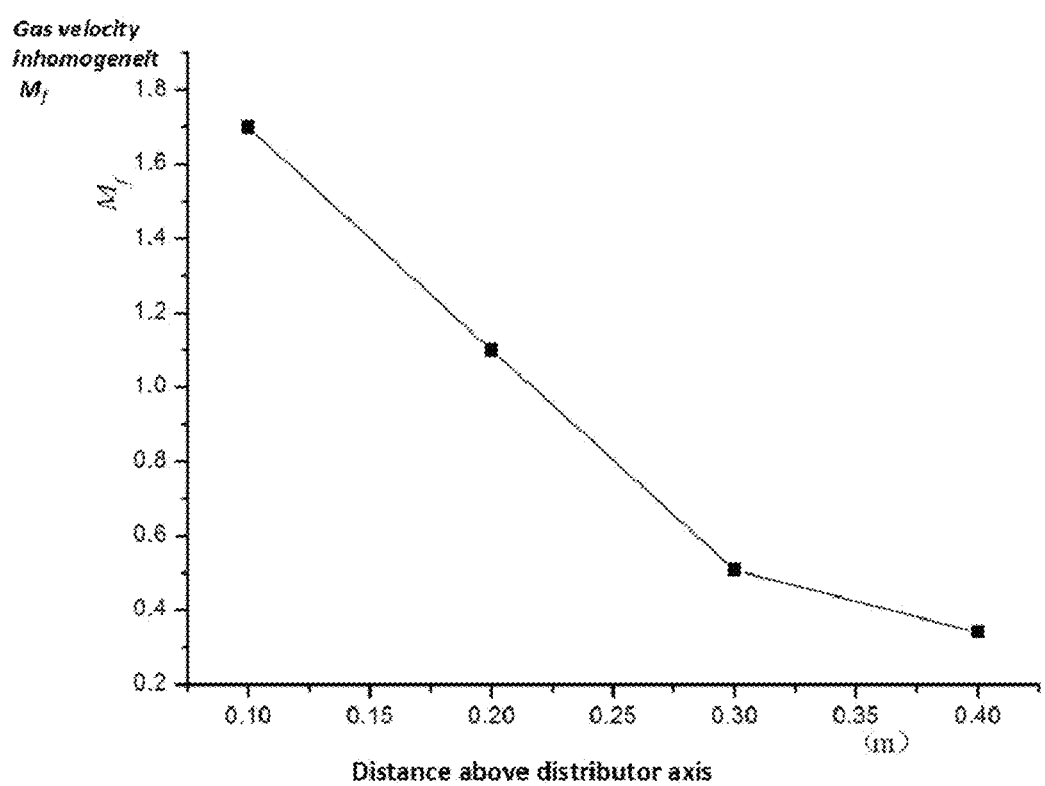
FIG. 19 is the diagram showing variation trend of uneven axial distribution above the radial diversion gas distributor inside the square packed tower.

As shown in FIG. 18, the gas is in uniform streamlined distribution on the distributor under the diversion and equalization action of the distributor, which basically eliminates whirlpool. Sections are taken at the point of Z=0.1/0.2/0.3/0.4m above the distributor, 7×7 velocity monitoring points are set on each section in reference to FIG. 5, and uneven velocity Mf is calculated on each section. Viewing from FIG. 19, it can be seen that gas velocity distribution inhomogeneity Mf is to be reduced accompanied by increase in height Z; in other words, gas velocity distribution is becoming more and more uniform; gas velocity inhomogeneity at the point of Z=0.3m is 0.5, which is in compliance with requirements for conventional gas distributor as required by conventional towers.

The invention claimed is:

1. A square packed tower for collection of flue gas $CO_2$, characterized in that the tower comprises an initial absorbent distributor on a lower end of a flue gas outlet, a vertical plate packing on the lower end of the initial absorbent distributor and a radial diversion gas distributor at a bottom of the square packed tower for delivery of carbon dioxide contained in the flue gas;

the radial diversion gas distributor comprises a gas inlet pipe, a flat base plate with four equal triangular protrusions, a flat seal plate with four equal triangular protrusions and a plurality of radial deflectors; the flat base plate with four equal triangular protrusions is connected with an outlet of the gas inlet pipe; the radial deflectors are in radial arrangement between the flat base plate with four equal triangular protrusions and flat seal plate with four equal triangular protrusions along the outlet of gas inlet pipe.

2. The square packed tower for collection of flue gas $CO_2$ according to claim 1, characterized in that the flue gas outlet is provided with a demister.

3. The square packed tower for collection of flue gas $CO_2$ according to claim 1, characterized in that the vertical plate packing is formed by a plurality of piled packing sheets with extrusions on upper ends of the piled packing sheets; each packing sheet is provided with a diversion chute penetrating throughthere; the diversion chute is located at the lower part of the extrusion; a diversion window is provided on the edge of the diversion chute.

4. The square packed tower for collection of flue gas $CO_2$ according to claim 1, characterized in that an inter-stage cooler and an additional packing are further provided between the vertical plate packing and radial diversion gas distributor; the additional packing is provided between a shell of the inter-stage cooler and a wall of the square packed tower.

5. The square packed tower for collection of flue gas $CO_2$ according to claim 1, characterized in that an inter-stage cooler comprises a shell and numerous heat exchange plate pairs; the heat exchange plate pairs are piled inside the shell; the heat exchange plate pair is composed of two symmetrical heat exchange plates;

a heat exchange channel is arranged between two symmetrical heat exchange plates in the heat exchange plate pair; the shell is accordingly provided with a coolant inlet and a coolant outlet connected with a heat exchange channel; a flue gas absorption channel is provided among the adjacent heat exchange plate pairs; the shell is accordingly provided with a flue gas inlet and absorbent inlet connected with the flue gas absorption channel; a projection and a flute are provided on both sides of the heat exchange plate.

6. The square packed tower for collection of flue gas $CO_2$ according to claim 5, characterized in that upper and lower ends of the heat exchange plate in the heat exchange plate pair are provided with an internally sealed juncture as connected to another heat exchange plate.

7. The square packed tower for collection of flue gas $CO_2$ according to claim 5, characterized in that an externally sealed juncture used to connect adjacent heat exchange plate pair is provided on left and right sides of the heat exchange plate in the heat exchange plate pair.

8. The square packed tower for collection of flue gas $CO_2$ according to claim 4, characterized in that a corrugated packing layer is provided between the inter-stage cooler and the radial diversion gas distributor.

9. The square packed tower for collection of flue gas $CO_2$ according to claim 4, characterized in that an absorbent collector and re-distributor is provided between the vertical plate packing and the inter-stage cooler.

* * * * *